(12) United States Patent
Andrén et al.

(10) Patent No.: US 7,406,364 B2
(45) Date of Patent: Jul. 29, 2008

(54) METHOD AND SYSTEM TO CALCULATE A DEMAND FOR ENERGY

(75) Inventors: Anders Andrén, Örsundsbro (SE); Peter Löfgren, Västerås (SE); Markku Rissanen, Västerås (SE); Gang Zhou, Västerås (SE)

(73) Assignee: ABB AB, Västerås (SE)

(*) Notice: Subject to any disclaimer, the term of this patent is extended or adjusted under 35 U.S.C. 154(b) by 0 days.

(21) Appl. No.: 10/489,717

(22) PCT Filed: Sep. 12, 2002

(86) PCT No.: PCT/SE02/01637

§ 371 (c)(1),
(2), (4) Date: Sep. 28, 2004

(87) PCT Pub. No.: WO03/023675

PCT Pub. Date: Mar. 20, 2003

(65) Prior Publication Data

US 2005/0055137 A1   Mar. 10, 2005

Related U.S. Application Data

(60) Provisional application No. 60/318,678, filed on Sep. 13, 2001.

(51) Int. Cl.
G05D 99/00 (2006.01)
G05B 15/00 (2006.01)
G05B 11/00 (2006.01)
G06F 17/00 (2006.01)
G06F 19/00 (2006.01)

(52) U.S. Cl. ............... 700/286; 700/9; 700/12; 700/22; 700/29; 700/291; 700/295; 700/296; 700/297; 705/412; 702/62

(58) Field of Classification Search ............... 700/9, 700/11, 12, 15, 17, 22, 28, 29, 83, 286–288, 700/291, 295–298; 705/412; 702/60, 61, 702/62, 188; 715/700, 748, 750, 961, 962, 715/963

See application file for complete search history.

(56) References Cited

U.S. PATENT DOCUMENTS

| 5,621,654 A | * | 4/1997 | Cohen et al. ............... 700/287 |
| 5,862,391 A | | 1/1999 | Salas et al. |
| 5,924,486 A | * | 7/1999 | Ehlers et al. ............... 165/238 |

(Continued)

FOREIGN PATENT DOCUMENTS

EP   0568822 A2   11/1993

(Continued)

*Primary Examiner*—Sean P Shechtman
(74) *Attorney, Agent, or Firm*—Venable LLP; Eric J. Franklin

(57) ABSTRACT

A method to calculate energy demand in an energy generation, transmission and distribution network including one or more power plants based on different energy source types including renewable energy, a communications system and one or more local consumption metering units. A customer demand profile for one or more customers is provided. A customer-specified proportion of power demand to be supplied from a given energy source type is registered. A total predicted energy demand dependent is calculated in part on an accumulated demand for the given energy source type.

19 Claims, 6 Drawing Sheets

U.S. PATENT DOCUMENTS

| | | | |
|---|---|---|---|
| 6,084,318 A * | 7/2000 | Mardirossian | 307/72 |
| 6,529,839 B1 * | 3/2003 | Ness et al. | 700/291 |
| 6,598,029 B1 * | 7/2003 | Johnson et al. | 705/37 |
| 6,681,156 B1 * | 1/2004 | Weiss | 700/291 |
| 6,745,105 B1 * | 6/2004 | Fairlie et al. | 700/273 |
| 6,961,641 B1 * | 11/2005 | Forth et al. | 700/295 |
| 2003/0036820 A1 * | 2/2003 | Yellepeddy et al. | 700/291 |
| 2003/0045969 A1 * | 3/2003 | Matsuo et al. | 700/291 |

FOREIGN PATENT DOCUMENTS

| | | |
|---|---|---|
| EP | 0814393 A1 | 12/1997 |
| WO | WO 97/47066 A1 | 12/1997 |

* cited by examiner

METHOD AND SYSTEM TO CALCULATE A DEMAND FOR ENERGY

CROSS-REFERENCE TO RELATED APPLICATIONS

This application claims priority to U.S. provisional patent application No. 60/318,678 filed 13 Sep. 2001 and is the national phase under 35 U.S.C. § 371 of PCT/SE02/01637.

TECHNICAL FIELD

The present invention relates to supervision and control of an energy generation, transmission and distribution system. In particular the present invention discloses a system, method and a computer program product for calculating a demand for energy from plants based one or more different energy source types, including electrical energy generated from a renewable energy source.

BACKGROUND ART

The consumption of energy and especially electricity is increasing worldwide; however, installing new large-scale distribution, transmission and/or generation capacity has become increasingly difficult. This is due to factors including increased load on the environment in the form of $CO_2$ emissions and to an unwillingness to invest in a de-regulated and/or fast-changing market. Increased consumption of energy coupled with reduced investment in physical plant, particularly of the traditional energy generation types has contributed to a diminished safety margin between available supply and instantaneous demand. Calculating energy demand forecasts has consequently become more complicated and fluctuations in consumption harder to predict within tighter margins between capacity and demand.

An example of an energy supply system is disclosed in European Patent Specification EP 0 568 822 B1. A system is disclosed for optimising an energy output of a single power generating unit in which an energy output is produced from a combination of different energy sources, a sources that have lesser environmental impacts. The total energy output for that generating unit is optimised at least in part so as to achieve a low or minimised generation of environmental pollutants.

Some recent energy systems have improvements based on Internet communication and/or standards associated with the Internet. U.S. Pat. No. 5,862,391 describes an extensive power management system for electrical power distribution comprising computers equipped for bus communication over a Modbus fieldbus connected to one or more DDE servers (Dynamic Data Exchange). The computers contain various software packages involved in monitoring and controlling selected aspects of power usage/consumption. Communications are described using TCP/IP (Transmission Control Protocol/Internet Protocol) via Ethernet LANs (Local Area Networks).

EP 814 393 A1 describes use of the Internet as a part of a method to communicate with electrical components, principally appliances in the home, for the purpose of supervision and control. The method requires an intelligent socket to be added to each appliance together with the use of signals superimposed on a power distribution network to communicate control signals.

SUMMARY OF THE INVENTION

It is an aim of the invention to provide a system and method to solve one or more of the problems described above.

The invention provides a means for power consumers to order energy based on a profile optimised by each individual consumer. The consumer-specified consumer demand profile takes into account energy type by source, and at least use patterns and price. Briefly, each consumer may use their consumer demand profile to specify to a power supplier, seller or re-seller one or more proportions of their energy use that should come from specified power plants based on different energy source types, including such as fossil fuel, renewable sources such as hydro or tidal power, as well as other more traditional sources. An energy supply company using the invention provides the above profile means to the power consumers, in order to calculate demand for energy from different sources according to the requirements specified by the power consumers by means of their profiles.

The invention provides companies in the energy supply industry with an intelligent system including the consumer demand profile for selling power from power plants preferably including renewable energy, comprising:

Renewable energy sources, as Wind, Hydro, Sun, Biomass, Ocean-streams, Tide etc

Traditional power plants based on energy sources such as fossile fuel, nuclear and so on, Measurement tools Softwares for data collection, statistical analysis, prognoses, control, optimization, communication etc.

By means of the invention, power supply companies:

can offer feedback, influence over source of supply, and more control of energy consumption to their end users;

can attract customers by e.g. refunds or rewards for high fraction of renewable energy consumption;

will automatically get information about end user demands and wishes concerning power demand including demand for power from renewable energy sources, (due to the user profiles of the end users), e.g. price and sensitivity to price for consumers of energy from different sources;

can easily develop new more efficient/accurate pricing of power from different kind of plants By means of the invention, consumers or End Users;

Gain greater control over power consumption, power source type, and energy cost, added control over time-based price for energy supplied, Added value for end-use including that of greater choice of which power product or service to consume.

In another aspect of the invention, power supply companies, power selling companies or re-selling companies also:

gain a means to gather information automatically for analysis and data mining to use for reducing energy purchasing costs by Trading strategy-options market Investment strategy Additional income is available from the information in the form of at least:

Customer habits—tradable

Installation and purchase suggestions—own delivery or tradable information for example about;

Heat pumps

Photovoltaic arrangements

Wind installations

Additional consumption controls

Pricing

Customer equipment diagnostics

In another an advantageous embodiment, additional options for energy consumption by power consumers that may be controlled either by the power supply company or by the consumer himself/herself or both by providing an intelligent control unit relative to the consumer.

The invention is in part carried out by means of a computer program product as described in patent claim 26. The computer program product is also summarily described here as comprising software portions and or computer program code elements for carrying out the steps and algorithms suitable for carrying out steps and calculations of the method according to the invention.

The main advantage of the invention is that management of energy demand, and in particular electrical power demand in an electrical power system may be calculated in a systematic way by power supply companies or power sales companies. The calculations may include instantaneous consumption, accumulated consumption, estimated future consumption, and estimated future consumption with known consumer price sensitivity margins. In line with common practice, time series may be used for calculating demand and demand forecasts.

A further advantage is that existing power distribution systems for most types of energy may be simply and economically retrofitted with embodiments of the invention and computer program products according to the invention.

BRIEF DESCRIPTION OF THE DRAWINGS

Embodiments of the invention will now be described, by way of example only, with particular reference to the accompanying drawings in which.

DESCRIPTION OF THE PREFERRED EMBODIMENTS

Figure 1:
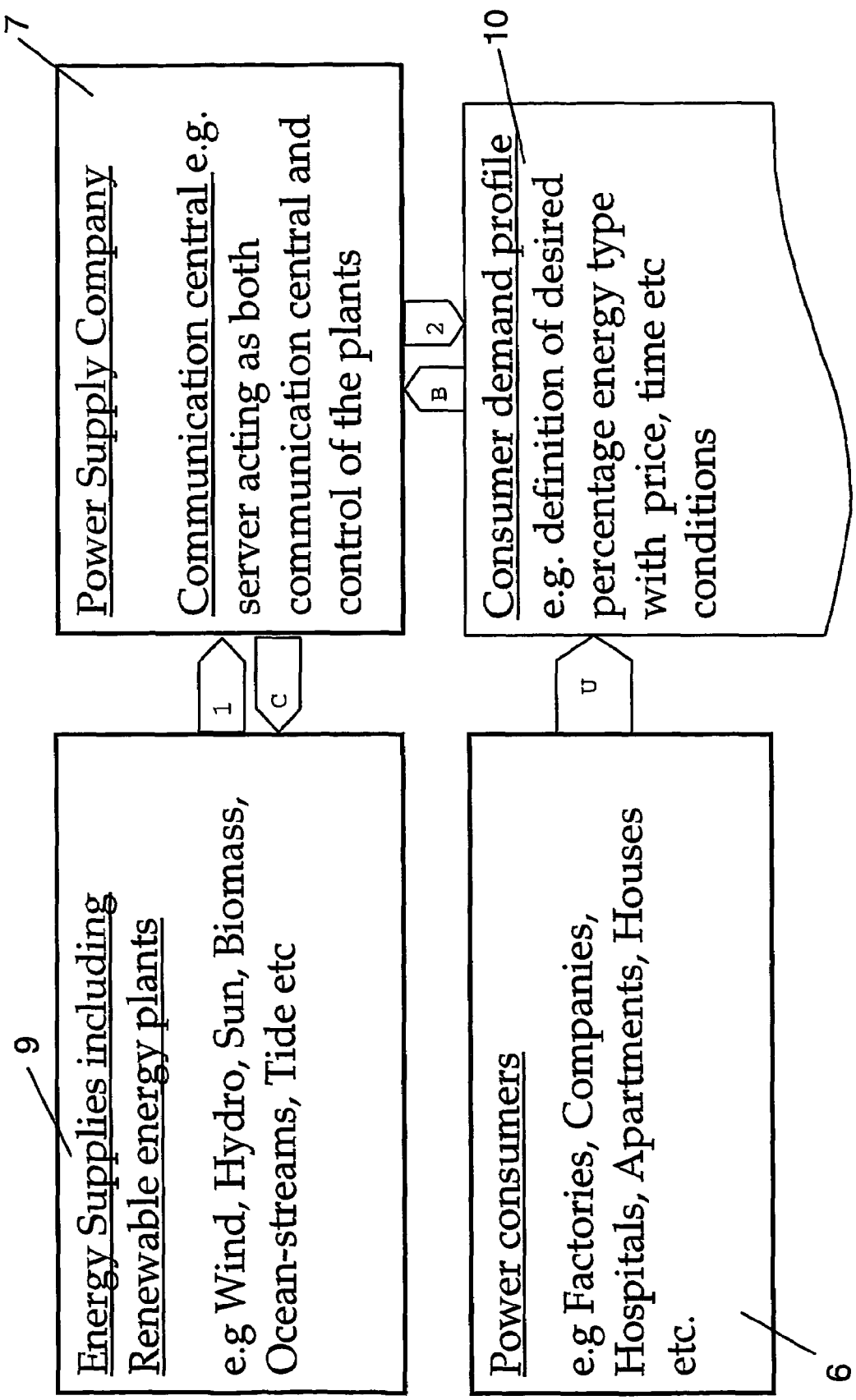
FIG. 1 shows a simplified block diagram for a system including a consumer demand profile according to an embodiment of the invention.

FIG. 1 shows a simple block diagram showing elements of a system including a consumer demand profile according to an embodiment of the invention. FIG. 1 shows a plurality of power plants 9, including power plants based on renewable energy sources, and a communication system 7 of a Power Supply Company, and a plurality of consumers and power consumers 6 of different types. It is understood that the power consumers are in some way connected to one or more power supply systems so as to receive power sold by the Power Supply Company from one or more of the power plants 9. A customer demand profile 10 is shown.

The customer demand profile 10 is a document, table or other means provided for each customer. The document is accessible and may be altered at will by each respective customer. Each consumer demand profile for each power consumer is accessible, and readable by the Power Supply Company. The Power Supply Company may also be able to change the available options listed on the consumer demand profile in real time.

In the system shown in FIG. 1 a number of information flows are symbolically indicated:

Power plants 6 make available to the Power Supply Company and its communication central 7 information designated:

1, instant power production; power production forecasts, and returns information and/or control signals:

C, power requirement from each power plant; control of power plants.

Power Supply Company and its communication central 7 determines based on the consumer demand profile means 10 information designated:

B, consumer demand profile requirements per energy source type, updates to consumer profiles;

optionally the Power Supply Company can make available through a suitable consumer demand profile means information about the consumer present and estimated demand including items such as;

2, energy use tracking and future forecasts; accumulated energy from all connected power plants; instant and accumulated costs, user profile evaluation; user contribution to reduced greenhouse effect; estimation of renewable energy compensation; change of emission rights, statements in respect of emission credits or similar.

The Power Consumers 9 can each access their respective consumer demand profile 10 designated as:

U, to configure a demand by percentage demand per energy source type, price conditions, time period and/or other conditions; update or change the demand profile; accept a proposed supply condition for a given source energy type.

Figure 2:
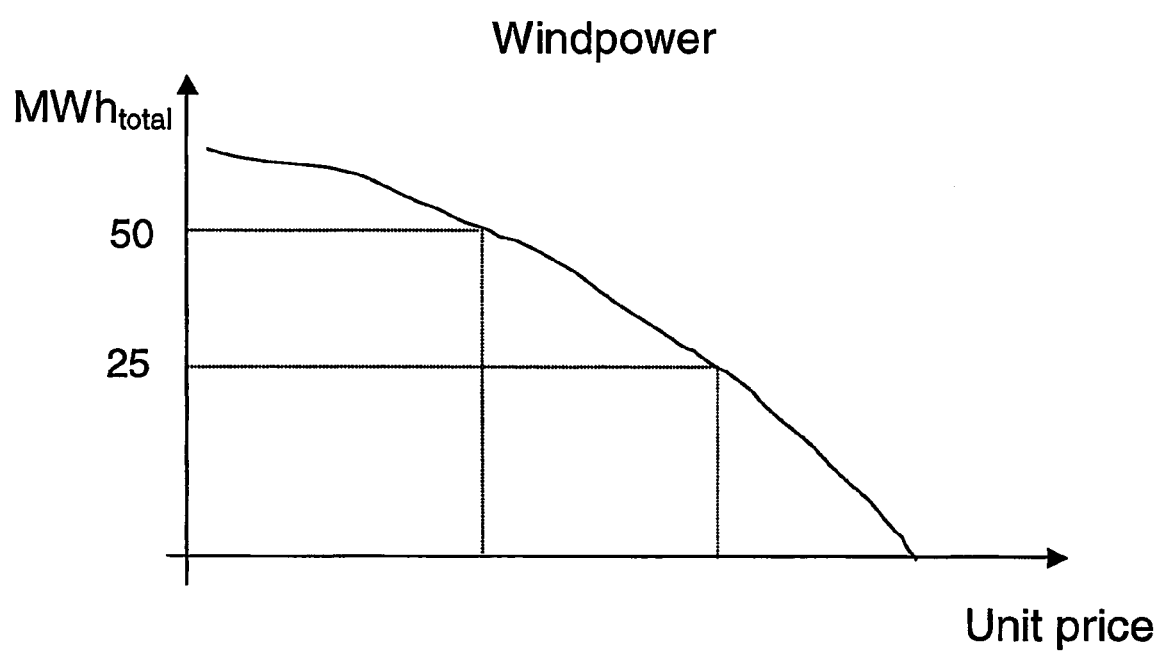
FIG. 2 shows a simplified diagram for a price per unit power supplied for power from a given energy source.

FIG. 2 shows a price/volume diagram for a power supply of a particular energy type, in this example it is electricity generated by Windpower. The diagram is created by summing across all the consumer demand profiles dependent on their predicted consumption over a predetermined time period.

Figure 3:
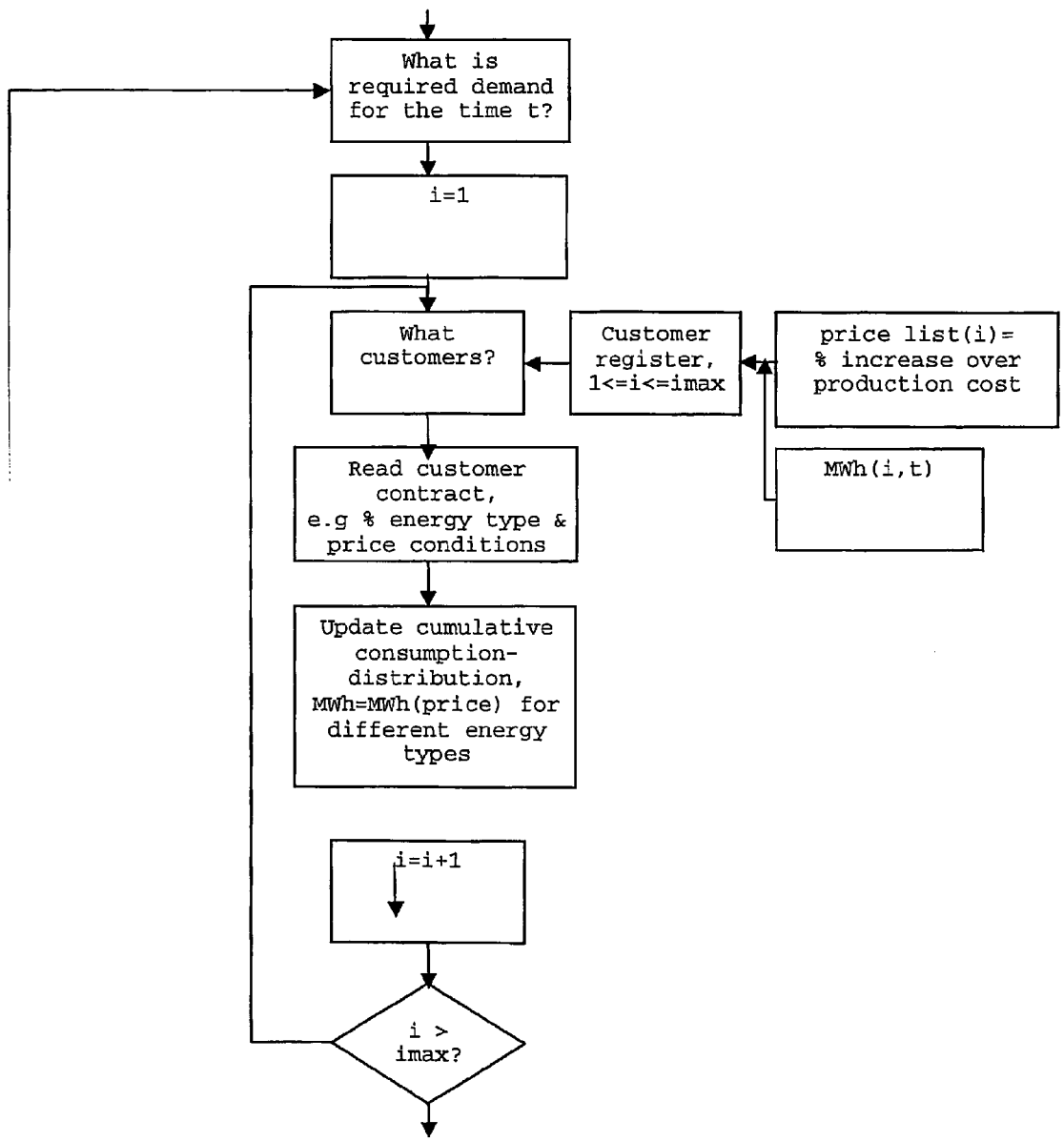
FIG. 3 shows a flowchart illustrating a method to calculate demand per time period according to an embodiment of the invention.

FIG. 3 shows a method according to the invention. The system in which the method is carried out will provide the method and algorithm shown in FIGS. 3-4 in order to determine the respective demand for power supply from plants based on different energy types preferably including renewables, e.g. wind power, hydropower, coal fired, nuclear. Since energy is traded in time series, e.g. MWh/time, the system must know what unit of time is being used to specify power demand. Usually this can be 1 hour, 1 day 1 month or 1 year.

For example if we select 1 hour. Next the counter i is set to 1. The customer register is queried for information about a customer #1, e.g. what 'markup' or other price adjustment that is added to his energy cost price, and what is the most likely energy consumption for this customer for the specified time.

This stored energy consumption is usually updated on line and stored with information identifying all relevant time intervals, e.g. fridays 16-17, the month October and so on. In a next step the system checks if the user contract has been modified.

The user contract includes the latest information from the customers demand profile 10. Thus the contract makes available, among other things, per power consumer, how much energy in percentage of total demand is required to be from a preferred energy type, and typically, a maximum allowed cost for this energy type at the stated percentage of total demand or percent range of demand.

In a next step, the cumulative consumption distributions for all energy kinds for all consumers of power are updated. This consumption distribution can be a curve such as the one shown in FIG. 2.

As with most price/volume situations, the higher the price of, in this example Windpower, the fewer customers accept to buy Windpower. Instead the power consumers that have specified a high percentage of Windpower in their customer demand profile have to accept some other kind of energy for that time period of power supply.

When this process illustrated in FIG. 3 is done for the full customer register, for the chosen time period, the cumulative distributions are stored.

Figure 4:
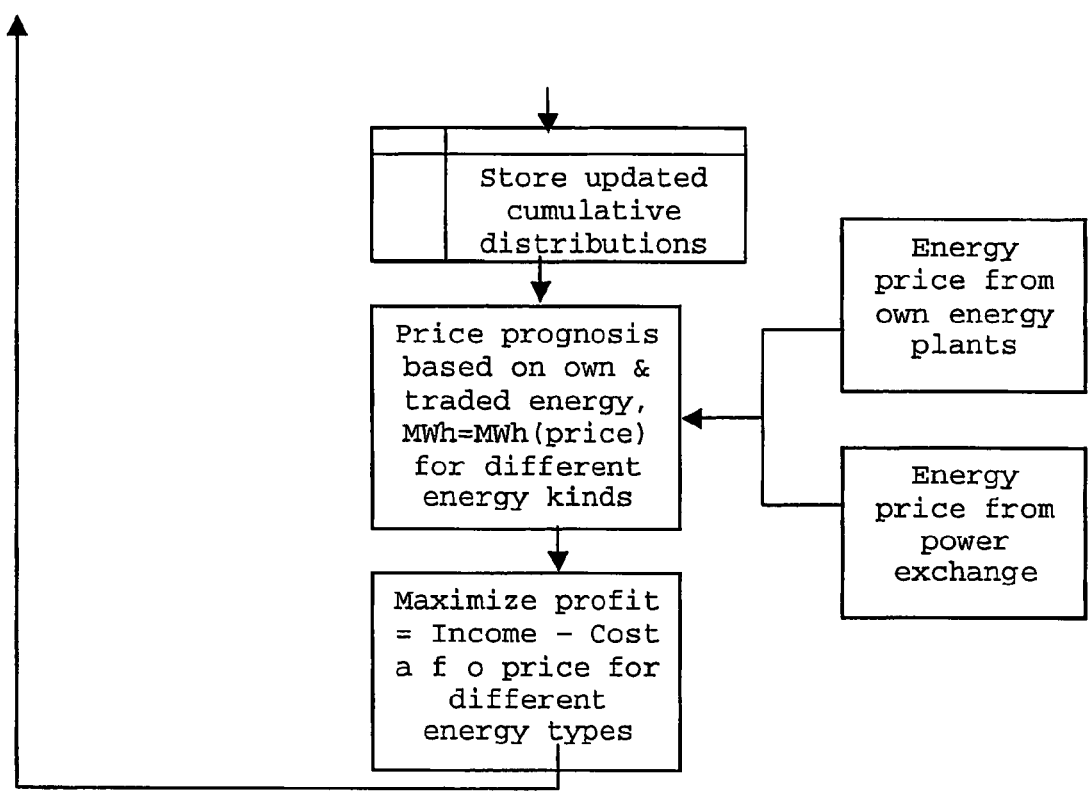
FIG. 4 shows a flowchart illustrating a method to calculate a power supply mix by energy type to meet customer demands calculated according to an embodiment of the invention.

FIG. 4 shows further steps of the method according to an embodiment of the invention. In this part of the method, the profit for the Power Supply Company selling the energy to the various power consumers is maximized by determining the best combinations of prices and mixes of the different energy kinds. This is best done with help of a multidimensional root finding algorithm, such as the Newton method described in a publication called Numerical Recipes in Fortran, published by Cambridge University Press. Included as an input to the algorithm is the energy cost to produce from own plants, and the cost to buy energy from another source such as a power exchange (or the income from selling produced power for example through the power exchange). In Scandinavia for example electrical power is traded on a recognized exchange. Utilities and other power companies in countries such as Sweden and Norway buy and sell electrical power on this electricity exchange as a commodity over various time periods. Normally it is less expensive to buy a large quantity of power from the power exchange than a small quantity. When the Power Supply Company has determined, for a given period and accumulated demand, the supply pattern with the maximum profit all the 'contracts' are then fulfilled dependent on the consumer demand profiles.

In another embodiment of the invention, an intelligent control unit is located at each power consumer premises, or at a relevant point on a distribution system relevant to each consumer. The intelligent control unit is in some way connected to, or associated with energy consumption measuring means, such as an electricity meter. The intelligent control unit 8 thus comprises information about the consumer load as currently measured. Information on historical loads may optionally be stored in part in the local unit. Further, the intelligent control unit may comprise means such as an interface to divide up consumption in to one or more identified part-loads, and means to switch on or off the part loads.

Figure 5:
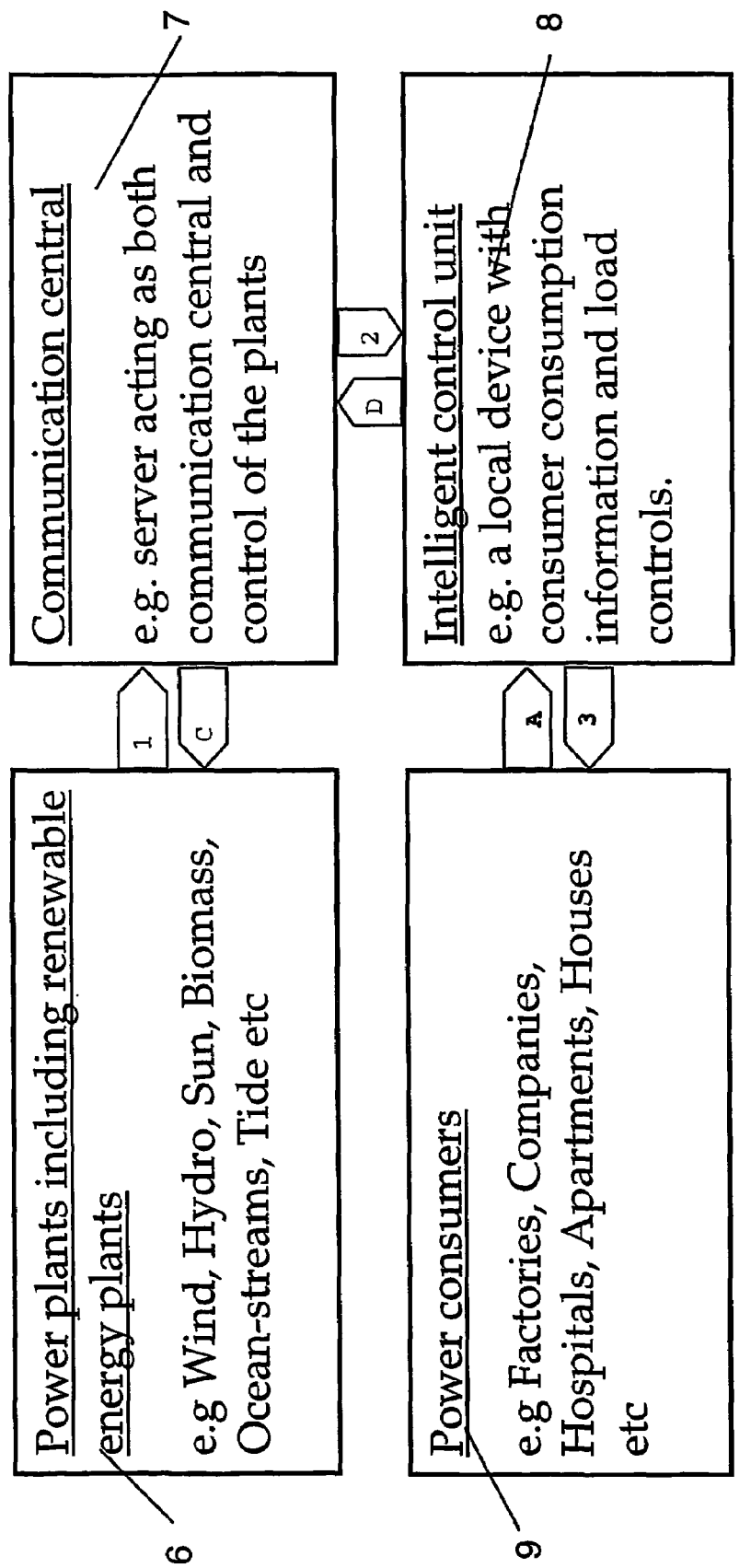
FIG. 5 shows a block diagram illustrating a system including an intelligent control unit located relative to a power consumer according to a further embodiment of the invention.

FIG. 5 shows a schematic representation of a system comprising one or more intelligent control units. FIG. 5 shows the Power plants including plants based on renewable energy 6, the Power Supply Company communication central 7, the power consumers 9 and an intelligent control unit 8. The intelligent control unit may comprise a computer, a processor, a controller of the PLC (Programmable Logic Controller) type, an embedded controller or any combination of the above.

Power consumers 9 may access their intelligent control unit 8 in order to schedule their demand as one or more of a number of part loads. These power part loads may be controlled or scheduled by the consumer.

In an advantageous aspect of this embodiment of the invention, the Power Supply Company 7 may control the power consumers 9 loads or part loads and adopt a form of load shedding. Dependent on the customer contract and customer demand profile 10, options may be selected by the consumer allowing the Power Supply Company to signal the intelligent control unit 8 to shed consumer-designated loads or part loads.

Such an intelligent control unit 8, situated locally or in some other way situated relative to each power consumer, may provide to the Power Supply Company and communication central 7 information such as:

A, instant power consumption; diagnostics of power consuming equipment;

D, instant and accumulated power consumption plus prognoses about future power consumption;

and the intelligent control unit may also include local memory means and other processor means to calculate and store consumer-related information including:

2, energy use tracking and forecasts of future demand; accumulated energy from all connected power plants; instant and accumulated costs, user profile evaluation; user contribution to reduced greenhouse effect; estimation of renewable energy compensation; change of emission rights, information in regard of emission credits. The above may form part of a distributed execution of computer program products otherwise comprised as part of the communication central function 7 of the Power Supply Company.

The Power Consumers 9 may in effect send power consumption information D back to Communication Central 7 via the Intelligent control unit 8. Power consumption information D may also comprise diagnostics of power consuming equipment and other information measured and/or derived from known power consumption by a given consumer or group of consumers.

A person such as a individual residential end user or an industrial or commercial power consumer employee may also have access to the consumer demand profile 10 so as, in addition to selections regarding proportion of demand from a given energy source type, to carry out some type of load limiting, scheduling or load shedding, including:

check a status of one or more part loads,
alter load shedding status for a part load,
change a timing setting for shedding a part load,
change a price-related setting for a part load.

Figure 6:
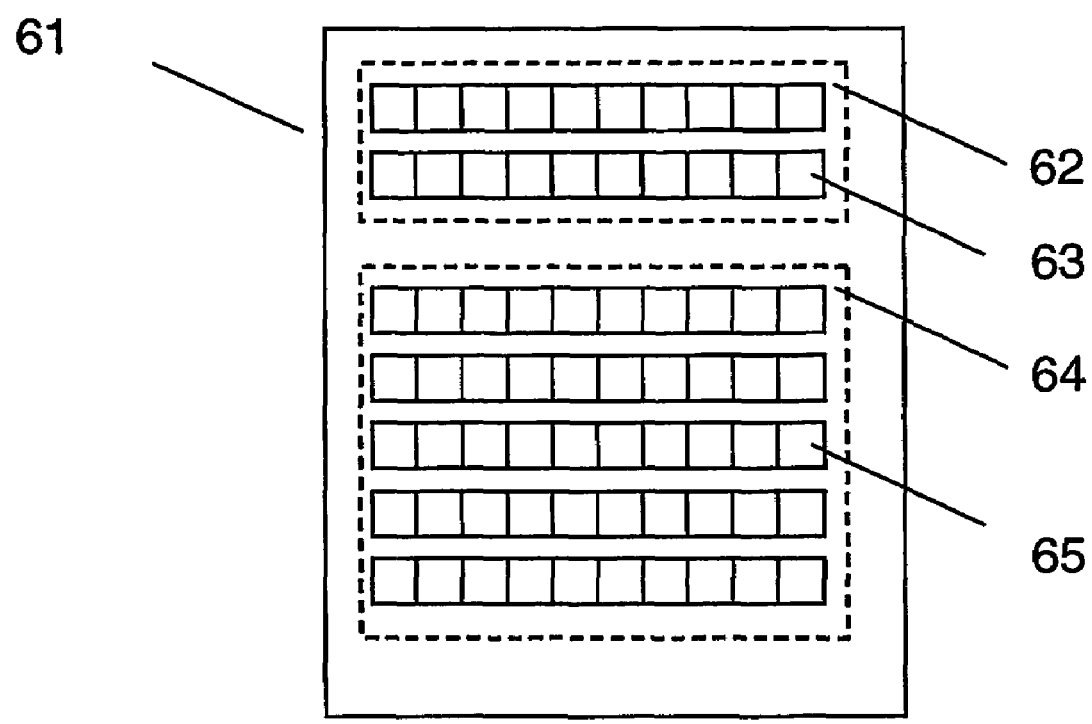
FIG. 6 shows a schematic format for a computer data signal generated according to an embodiment of the invention.

Control signals that may be comprised in information C shown in FIG. 1, 4 sent from the Power Supply Company to one or more Power plants 6 including plants based on renewable energy sources may be sent in a format compatible with Web based standards. In particular the signal, a data communication signal, is preferably compatible with XML, extensible Markup Language, the Extensible Style Language (XSL) standard, or a derivative thereof. Such signals may switch a power plant on or off or in some other way change the power output level. FIG. 6 shows a schematic format for a data communication signal shown as 61. The signal comprises identifying data means 63 to identify message recipient such as a given Power Plant. The indication for which data type 62 is included in the signal, such as XML, XSL, SOAP or similar will ordinarily be indicated, and may be formatted separately from the data content 64. The data content 64 contained in the signal comprises data means 65 to invoke a remote procedure call to a change a Power Plant output or switch a Power Plant output on or off.

Similarly, and signals sent by Power Supply Company and communication central 7 to an intelligent control unit 8 may also be comprised in part as XML and/or XSL or other formats derived from SGML. This could also be represented by FIG. 6, the schematic format for a data communication signal shown as 61 ordinarily comprises identifying data means 63 to identify an intelligent control unit 8 as the message recipient. The indication for which data type 62 is included in the signal, such as XML, XSL or similar will ordinarily be indicated, and may be formatted separately from the data content 64. The data content 64 contained in the signal comprises data means 65 to invoke a remote procedure call to switch a load or part load on or off.

The method of the invention described above and illustrated schematically in FIGS. 3, 4 is best carried out by one or more computer programs, or computer program products. The computer program product contains software portions and or computer program code elements for carrying out the steps and algorithms suitable for carrying out steps of the method according to the invention such as for calculations such as in steps shown in FIGS. 3, 4.

The intelligent control unit 8 may comprise wireless means for communication with the Power Supply Company communication central 7. A wireless means compatible with a standard such as Bluetooth (Trade Mark), the wireless Ethernet standard IEEE 802.11b, wireless ATM (Asynchronous Transfer Mode) network standard IEEE 802.11a or the standard according to HomeRF in a suitable device or with a suitable plug-in card may be used to enable communication directly between the intelligent control unit 8 and a local computer so that an interface to intelligent control unit may be accessed by the computer. Likewise it is possible to use an IR connection, compatible with IrDA (Infrared Data Association) standards for example, to establish a connection and access an interface to the intelligent control unit 8. Normally, the intelligent control unit 8 is connected to a fixed communication means such as a data network, LAN, telephone, dedicated line and so on. The intelligent control unit may also be provided with a wireless link to a data network.

By using a computer or a portable computer an authorised power company person for any intelligent control unit, or a power consumer for his/her own intelligent control unit may carry out any of the following steps:

access an interface for an intelligent control unit,
examine a state of a process monitored by the intelligent control unit,
select a supply or part supply depending on power supply from a given energy source,
change a priority of a load or part load,
switch off or switch on a load.

The price-related setting enables a consumer's electrical loads to react to offers from the power network for energy at a certain price at a certain time, exchange power sources and or shed loads at a certain price and time. This is in addition to options related to one or more specified proportions of energy demand to be supplied from one or more given energy source types via the consumer demand profile 10.

A computer and the intelligent control unit 8 or an interface to the intelligent control unit may be established directly by direct connection by any of the following means or in whole or in part via a telephone. Telephone contact via a LAN or Internet provider to a web-based access is one method. Another method is to use, for example, a wireless means such as a Bluetooth (Trade Mark), IEEE 802.11b, or HomeRF device to enable communication via a telephone or modem to a private telephone network, a private or public cellular telephone network, wireless broadband networks such as the 3G type, wired broadband networks or an ordinary Public Switched Telephone Network (PSTN). It is also possible to communicate with the intelligent control unit using paging systems, at least to the extent such that any information originating from the intelligent control unit 8 may be communicated by the Power Supply Company communication central 7 to a pager, and displayed on the pager display of a pager carried by a network operator, maintenance person, employee of an industrial/commercial consumer, or an individual consumer. More sophisticated pagers with two-way text sending facilities, such as two-way pagers for example of the type available from Motorola Inc., enable a signal to be returned to the intelligent control unit, such as to accept a new tariff or a special offer for a price/time/usage tariff, accept a load priority change and so on.

It is especially advantageous that an operator, power network employee or contractor or other person located at or remote from a distribution equipment site, may access an interface to intelligent control unit by using a telephone arranged with Wireless Application Protocol (WAP) or I-Mode (or any similar graphically enabled protocol) capable of displaying data on a display of a telephone or other handheld computing device, and accepting input related to the display. By means of a display and an input means the person can perform for example the steps of the method described above and elsewhere in this description. This means that a person can examine information provided by the Power Supply Company commnication central 7 system and/or accessible via an interface either the consumer demand profile 10 or the intelligent control unit 8 or both. The person can carry out an action such as examine the existing profile, make a decision, change a percentage of demand, change a percentage power from a given energy source, change a load priority, choose a price tariff or to carry out any aspect of the method of the invention by issuing an instruction. Input means for portable devices may include a keyboard, telephone touchpad, mouse, thumbwheel, slider, button or other arrangement for inputting a signal to a computing device or phone.

There are many handheld computing devices available that are arranged or may easily be arranged for wired and wireless communication. A Personal Data Assistant (PDA) product such as a Palm Pilot (Trade Mark) and Psion (Trade Mark) with IR (Infra Red) or telephone or Internet connection means may be used to access an interface to an intelligent control unit device and/or the consumer demand profile. By use of any of the above exemplary handheld means, a person may carry out any of the following actions via the intelligent control unit:

access an interface for intelligent control unit,
select a monitoring action,
examine a state of a process monitored by the intelligent control unit
select a control action,
change an energy supply source,
switch off or switch on a part load.

The computer program products according to the invention may be stored at least in part in or on different mediums that are computer readable. Archive copies may be stored on standard magnetic disks, hard drives, CD or DVD disks, or magnetic tape.

The databases and libraries are stored preferably on data servers, but the computer program products may, for example at different times, be stored in any of; a volatile Random Access memory (RAM) of a computer or processor, a hard drive, an optical or magneto-optical drive, or in a type of non-volatile memory such as a ROM, PROM, or EPROM device.

The consumer demand profile shown in FIG. 1 may be stored in a part of the Power Supply Company communication central 7, or in the intelligent control unit 8 or, alternatively, in another local device, by means of a memory such as of the RAM or hard disk type. The profile may optionally be stored on a data server that is not local to intelligent control unit.

The computer program product may also be arranged in part as a distributed application capable of running on several different computers or computer systems at more or less the same time.

It is also noted that while the above describes exemplifying embodiments of the invention, there are several variations and modifications which may be made to the disclosed solution without departing from the scope of the present invention as defined in the appended claims.

The invention claimed is:

1. A method to calculate energy demand in an energy generation, transmission and distribution network, comprising one or more power plants based on different energy source types including renewable energy, a communications system and one or more local consumption metering units, the method comprising:
   providing a customer demand profile for one or more customers,
   registering a customer-specified proportion of power demand to be supplied from a given energy source type and a given supplier,
   registering a customer-specified maximum cost price profile,
   calculating a total predicted energy demand dependent in part on an accumulated demand for the given energy source type and the given supplier,
   determining available energy source types, demands for the available energy source types and cost price of energy for the available energy source types, and
   supplying energy to the one or more customers based on the customer demand profile, customer-specified proportion of power demand, customer maximum cost price profile, calculated total predicted energy demand, available energy source types, demands for the available energy source types and cost price of energy for the available energy source types.

2. The method according to claim 1, further comprising:
   calculating a total accumulated energy demand dependent on accumulated demands from every available power supply of a given energy source type,
   providing a customer demand profile to one or more customers, and
   supplying power from an optimized mix of available power supplies from different energy source types to meet the calculated total accumulated demands.

3. The method according to claim 1, further comprising:
   calculating a total accumulated energy demand dependent in part on cost price for power produced by available power supply sources; and
   supplying power in accordance with the calculated total accumulated energy demand.

4. The method according to claim 1, further comprising:
   calculating a total accumulated energy demand dependent in part on a known cost price for power purchased from any available power supply source; and
   supplying power in accordance with the calculated total accumulated energy demand.

5. The method according to claim 1, further comprising:
   optimizing a mix of power supplies from different energy source types by means of a multidimensional root finding algorithm.

6. The method according to claim 1, further comprising:
   specifying consumer power consumption changes by means of any of load scheduling, load switching, load shedding configured through an intelligent control unit relative to a consumer; and
   supply power in accordance with the specified consumer power consumption changes.

7. The method according to claim 6, further comprising:
   making consumer power consumption changes by means of instructions issued centrally by a Power Supply Company communication central to a local intelligent control unit.

8. The method according to claim 6, further comprising:
   making consumer power consumption changes by means of instructions issued locally by a intelligent control unit.

9. The method according to claim 1, further comprising:
   specifying consumer demand by means of the consumer demand profile as well as configuration load switching by a local intelligent control unit.

10. A system to calculate energy demand in an energy generation, transmission and distribution network, comprising:
    one or more energy producing plants including plants based on renewable energy sources,
    a communications system comprising an energy demand profile for a power consumer and a maximum cost price profile for the power consumer, the energy demand profile including a customer-specified proportion of power to be supplied from a given energy source type and a given supplier,
    a calculation and algorithm system for calculating a total predicted energy demand dependent in part on an accumulated demand for the given energy source type and the given supplier, the calculation and algorithm system also for determining available energy source types, demands for the available energy source types and cost price of energy for the available energy source types, and
    means for supplying energy to the power customer in accordance with the energy demand profile, customer-specified proportion of power demand, customer maximum cost price profile, calculated total predicted energy demand, available energy source types, demands for the available energy source types and cost price of energy for the available energy source types.

11. The system according to claim 10, further comprising:
    calculation means and algorithm means to determine an optimal mix of power supplies from different energy source types to meet an accumulated total demand by means of a multidimensional root finding algorithm.

12. The system according to claim 10, further comprising:
    a consumer demand profile provided accessible and configurable over the Internet by any of one or more power consumers.

13. The system according to claim 10, further comprising:
    an intelligent control unit for a power consumer and comprising information about a measured consumption load of said power consumer.

14. The system according to claim 13, wherein the intelligent control unit is configured suitable to change a status of one or more part-loads by any of switching a part load on, off, activated at a scheduled time.

15. The system according to claim 10, wherein the system is configured to regulate one or more electrical power supplies in a part of a power generation, transmission and distribution network in order to meet a requirement dependent on a percentage of demand to be met from a given energy source type.

16. The system according to claim 10, wherein the system is configured to regulate one or more electrical loads in a part of a power generation, transmission and distribution network in order to meet a requirement dependent on a cost of electricity.

17. The system according to claim 10, wherein the system is configured to supervise and control management of electrical power demand in an electrical power distribution network.

18. The system according to claim 10, wherein the system is configured to utilize a process running on one or more computers to supervise, control, and manage electrical power demand in an electrical power distribution network.

19. A computer program product, comprising:
a computer readable medium; and
software code portions or computer program elements recorded on the computer readable medium and executable by a computer, a processor or a controller, to carry out a method comprising
providing a customer demand profile for one or more customers,
registering a customer-specified proportion of power demand to be supplied from a given energy source type and a given supplier,
registering a customer-specified maximum cost price profile,
calculating a total predicted energy demand dependent in part on an accumulated demand for the given energy source type and the given supplier,
determining available energy source types, demands for the available energy source types and cost price of energy for the available energy source types, and
supplying energy to the one or more customers based on the customer demand profile, customer-specified proportion of power demand, customer maximum cost price profile, calculated total predicted energy demand, available energy source types, demands for the available energy source types and cost price of energy for the available energy source types.

* * * * *